United States Patent [19]

Horn

[11] 4,215,832

[45] Aug. 5, 1980

[54] INVERTED CONE AIRCRAFT

[76] Inventor: George L. Horn, 1831 Airport Hwy., Toledo, Ohio 43609

[21] Appl. No.: 947,068

[22] Filed: Sep. 29, 1978

[51] Int. Cl.² .................... B64C 3/10; B64C 31/02
[52] U.S. Cl. ........................... 244/16; 46/79; 244/12.2; 244/23 C; 244/93
[58] Field of Search ............. 244/13, 15, 16, 12.2, 244/23 C, 34 A, 4 R, 153 R, 154, 93; D12/71; D21/86, 88; 46/74 R, 74 D, 76 R, 79; 273/106 R, 106 B

[56] References Cited

U.S. PATENT DOCUMENTS

| | | | |
|---|---|---|---|
| D. 171,327 | 1/1954 | Gould | D21/86 |
| 2,588,293 | 3/1952 | Roe | 244/153 R |
| 2,718,364 | 9/1955 | Crabtree | 244/12.2 |
| 2,953,320 | 9/1960 | Parry | 244/12.2 |
| 3,432,120 | 3/1969 | Guerrero | 244/93 X |

FOREIGN PATENT DOCUMENTS 2246469  3/1973  Fed. Rep. of Germany .......... 46/74 D

*Primary Examiner*—Barry L. Kelmachter
*Attorney, Agent, or Firm*—Wilson, Fraser, Barker & Clemens

[57] ABSTRACT

An aircraft is disclosed which includes a body having the shape of an inverted cone with a downwardly extending rim formed about the edge thereof and a triangularly shaped tail section. The aircraft can be constructed as a glider or a powered device and several alternative tail sections are shown such as square, radii, circle and tangent.

10 Claims, 9 Drawing Figures

INVERTED CONE AIRCRAFT

BACKGROUND OF THE INVENTION

1. Field of the Invention

This invention relates in general to discoid-shaped aircraft and in particular to an inverted cone airfoil which uses a triangularly-shaped tail section to provide flight stabilization.

2. Description of the Prior Art

Conventional aircraft rely on narrow extended wing structures which are designed, when quickly passed through the air, to create the pressure differential needed for lift. The same principle has been applied to aircraft utilizing a single annular wing structure, such as a saucer or cone shaped airfoil. These foils have typically relied on propeller rotation, external ailerons, or their own rotational inertia for stability.

Most of the known prior art relating to the present invention is concerned primarily with the shape of the airfoil. U.S. Pat. Nos. 2,826,860, issued to L. F. Ashley et al., 2,936,972, issued to J. Zinavage, and 2,947,496, issued to A. L. Leggett disclose saucer or cone shaped airfoils. In some instances, the cone has been truncated, forming a centerered circular opening. For example, U.S. Pat. No. 3,580,580 issued to J. D. Wark et al., discloses a simple aerial spinning disk which is comprised of a generally flat annular wing with a centered circular opening and downwardly extending inner and outer flanges. Similarly, U.S. Pat. Nos. 3,525,484, issued to L. E. Mueller, and 3,603,033, issued to L. E. Mueller, also disclose saucer shaped airfoils having ducted fan-type propulsion systems in the concentric circular opening.

U.S. Pat. No. 2,718,364, issued to E. L. Crabtree discloses an aircraft having an annular cone fuselage with a circular central aperture. An air control device fits into the aperture and is elevated when used as the principal air control element. Separate propulsion systems are used for horizontal and vertical flight. U.S. Pat. No. 2,730,312, issued to L. W. Crookes, discloses a discoid-shaped aircraft which includes a rear vertical stabilizer.

SUMMARY OF THE INVENTION

The present invention concerns an inverted cone airfoil with a downwardly extending rim which uses a triangularly-shaped tail section to provide flight stabilization. As the airfoil passes through the air, a pressure differential is formed between the top and bottom surfaces of the foil, creating the lift necessary for flight. In the five embodiments shown, the geometric configurations of the tail section include the triangle, square, circle, radii, and tangent forms, each of which has its own characteristic stabilizing influence on the craft.

It is an object of the present invention to improve the stability of discoid-shaped aircraft through the addition of one of a plurality of geometrically shaped tail sections.

DESCRIPTION OF THE PREFERRED EMBODIMENTS

Figure 1:
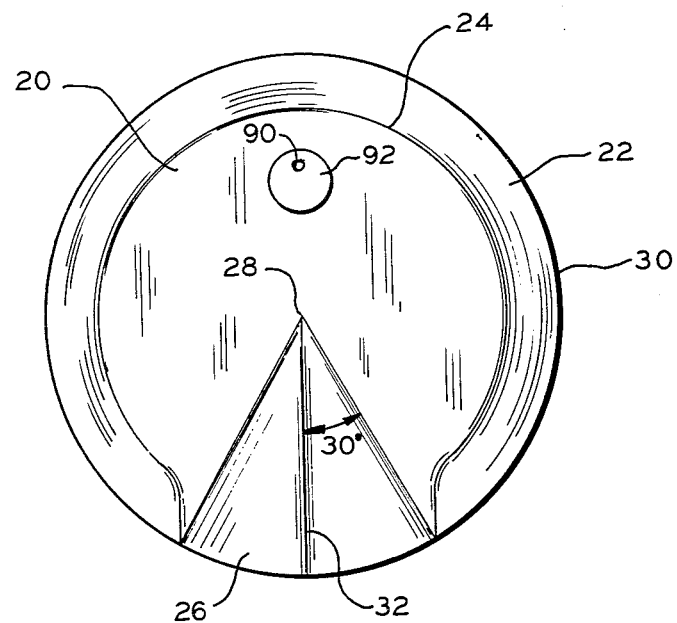
FIG. 1 is a plan view of an aircraft according to the present invention.
Figure 2:
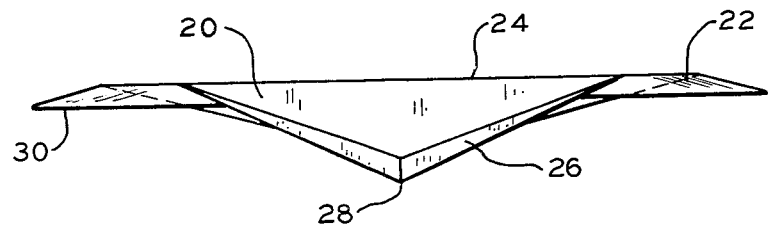
FIG. 2 is a rear elevational view of the aircraft shown in FIG. 1.
Figure 3:
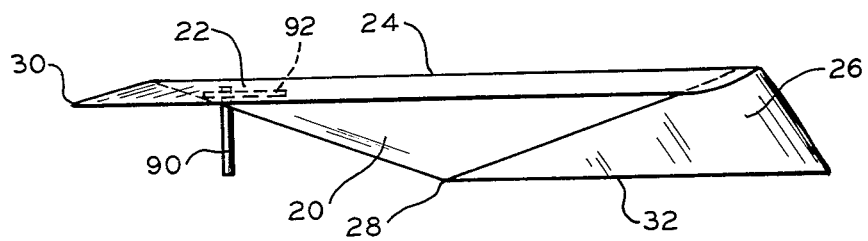
FIG. 3 is a side elevational view of the aircraft shown in FIG. 1.

There is shown in FIG. 1 a plan view of the present invention in its preferred embodiment. The aircraft includes a body 20 having the shape of an inverted right circular cone and rim 22 extending downwardly from an edge 24 of the cone. The aircraft also includes a triangularly shaped tail section 26 extending from a point 28 of the body 20 to an outer edge 30 of the rim 22. FIGS. 2 and 3 are rear and side elevational views respectively.

In the preferred embodiment, the sides of the cone are formed at approximately 77.5° to the axis of generation of the cone. The rim 22 is angled downwardly at approximately 10° from the horizontal. The radius at the base of the cone should be approximately 85 percent of the radius of the rim 22, the horizontal distance between the point 28 and the edge 30. For example, if the radius of the rim 22 is six inches, then the radius of the cone is 5.1 inches and the horizontal width of the rim is 0.9 inches. It is recommended that the dimensions be maintained with a plus and minus tolerance of one half percent.

The tail section 26 replaces an approximately 60° sector in the body 20 and the rim 22. A lower edge 32 of the tail section extends horizontally from the point 28 for a distance equal to the radius of the rim 22. The lower edge 32 and the edges of the sector define two sides of a pair of triangularly shaped panels forming the tail section. The lower edge 32 defines the longitudinal axis of the aircraft for flight. Propulsion systems, balance weights and payload must all be referenced from the longitudinal axis to maintain the aircraft in trim. The sides of the tail section extend upwardly and outwardly from the lower edge 32 to intersect the body 20 and the rim 22 to define tail section. Although the triangularly shaped tail section is preferred, several other shapes have been successfully flown as discussed below.

Figure 4:
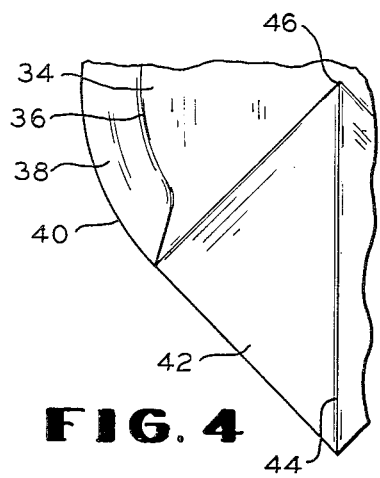
FIG. 4 is a fragmentary plan view of the present invention with an alternate square tail section.
Figure 5:
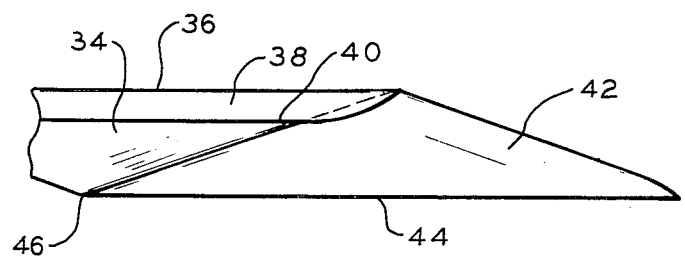
FIG. 5 is a side elevational view of the aircraft shown in FIG. 4.

An alternate embodiment of the tail section is the square configuration, shown in FIG. 4 which is a fragmentary plan view of the aircraft. The aircraft includes a body 34 having an edge 36 and a rim 38 having an outer edge 40, the rim 38 being attached at the edge 36 of the body 34. A tail section 42 replaces an approximately 90° sector in the body 34 and the rim 38. A lower edge 44 of the tail section extends from a point 46 of the cone horizontally beyond the edge 40 of the rim 83. The sides of the tail section 42 extend upwardly and outwardly from the lower edge 44 to intersect the body 34 and the rim 38 to define the aircraft. In the plan view, the tail section is substantially square in shape. FIG. 5 is a side elevational view of the tail section shown in FIG. 4.

Figure 6:
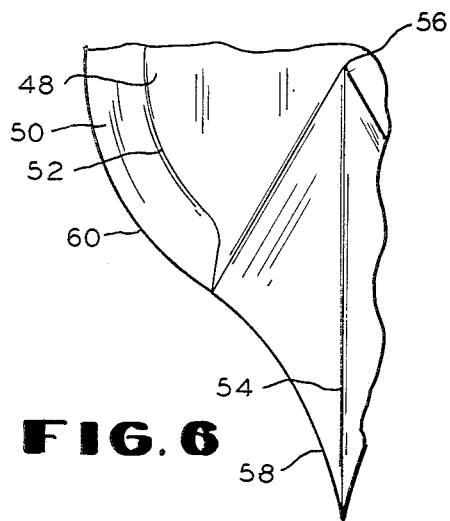
FIG. 6 is a fragmentary plan view of the present invention with an alternate radii tail section.
Figure 7:
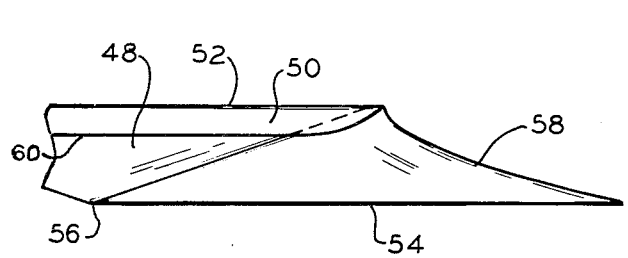
FIG. 7 is a side elevational view of the aircraft shown in FIG. 6.

There shown in FIG. 6 a fragmentary plan view of the present invention including an alternate radii tail section. The aircraft includes a body 48 having the shape of an inverted right circular cone and a rim 50 extending downwardly from an edge 52 of the cone. The aircraft also includes a tail section having a lower edge 54 extending from a point 56 of the body 48 in a plane generally parallel to the plane of the edge 52. The tail section replaces an approximately 60° sector in the body 48 and the rim 50. An outer edge 58 of the tail section is formed at a radius equal to the radius of the rim 50 at its edge 60 and is tangent to the edge 60 at the starting point of the tail section which is 30° from the longitudinal axis of the aircraft. FIG. 7 is a side elevational view of the tail section shown in FIG. 6.

Figure 8:
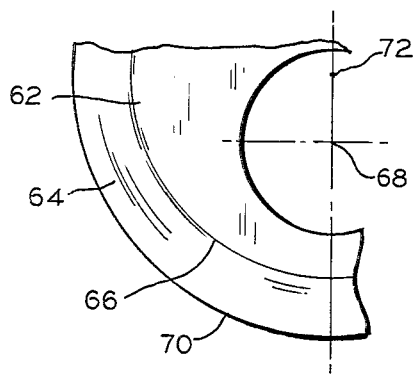
FIG. 8 is a fragmentary plan view of the present invention with an alternate circle tail section and FIG. 9 is a fragmentary plan view of the present invention with an alternate tangent tail section.

There is shown in FIG. 8 a plan view of an aircraft according to the present invention with an alternate circle tail section. The aircraft includes a body 62 having the shape of an inverted right circular cone and a rim 64 extending downwardly from an edge 66 of the cone. The tail section is formed as a circular aperture in the body 62. The center 68 of the aperture is located along the longitudinal axis of the aircraft and is approximately 0.25 times the radius of the rim 64 at an edge 70 from a center point 72 of the body 62.

Figure 9:
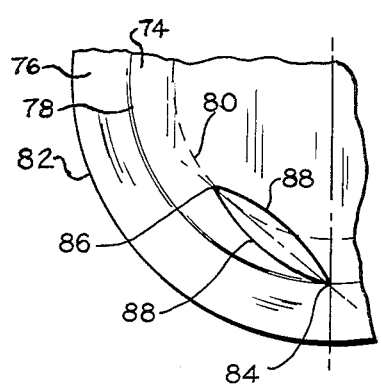

There is shown in FIG. 9 a plan view of the present invention including an alternate tangent tail section. The aircraft includes a body 74 having the shape of an inverted right circular cone and a rim 76 extending downwardly from an edge 78 of the cone. The tail section is formed as a pair of slots which are longitudinally positioned tangentially to an imaginary circle 80 having a radius which is 0.3 times the diameter of the aircraft at an edge 82 of the rim 76. The longitudinal axis of each slot intersects the junction of the longitudinal axis of the aircraft and the edge 78 at a point 84. The longitudinal axis of the slot extends from the point 84 to a point 86 of tangency to the circle 80. The longitudinal axis extending between the points 84 and 86 forms a chord for a pair of semi-circular edges 88 of the slot. Each of the edges 88 is defined as a portion of a circle having the same diameter as the rim 76 at its edge 82.

The present invention has a plurality of applications. It can be used as a manually propelled toy aircraft for example. Referring to FIGS. 1 and 3, a pin 90 is attached to the body 20 along the longitudinal axis of the aircraft and at a position to balance the added weight of the tail 26 to maintain the center of gravity of the aircraft at the point 28. If the pin is placed too close to the tail, the aircraft will tend to stall and, if the pin is placed to far from the tail, the aircraft will tend to dive. The typical range for the point of placement is between 0.44 and 0.55 of the radius of the rim as measured from the point 28 to the edge 30. Such a toy aicarft might be constructed of a lightweight plastic or similar material and can include a shiftable weight 92 rotatably fastened to the pin 90. The center of gravity of the weight 92 is offset from the position of the pin 90 such that the weight 92 can be rotated to the right or left to cause the aircraft to bank in the same direction. A typical launching device may consist of a heavy rubber band which is looped about the bottom end of the pin 90. The other end of the rubber band and the aircraft are then moved apart stretching the rubber band. Upon release of the aircraft, the rubber band will thrust the aircraft into the air and the aircraft will function as a glider.

The aircraft according to the present invention can also be utilized as a powered model aircraft. The enginer should be mounted along the longitudinal axis of the aircraft and weight should be added to maintain the center of gravity at the point of the cone. The aircraft could be radio controlled and include a shiftable weight similar to the weight 92 shown in FIG. 1 which also might be radio controlled for banking the aircraft. A rudder and elevators could also be added in the tail section to provide further control. Larger sizes of the aircraft could be utilized to carry cargo and passengers.

The body, the rim and the tail section surfaces can also be concave or convex or any combination thereof without departing from the basic structure and operation of the invention. In accordance with provisions of the patent statutes, the principle of mode of operation of the invention have been explained and illustrated in its preferred embodiments. However, it must be understood that the invention may be practiced otherwise than specifically illustrated and described without departing from its spirit or scope.

What is claimed is:

1. An aircraft comprising a body having sides formed in the shape of an inverted cone with a lower point, a generally planar upper edge and a sector shaped opening, a downwardly extending rim formed about the upper edge of said body and having an inner edge attached to the upper edge of said body, an outer edge and an opening adjacent the sector shaped opening, and a tail section formed along a longitudinal axis of said body, said sector shaped opening and the opening in said rim.

2. An aircraft according to claim 1 wherein the sides of said body are formed at approximately 77.5° to the axis of generation of the cone.

3. An aircraft according to claim 1 wherein said rim is formed at approximately 10° with respect to the plane of the upper edge of said body.

4. An aircraft according to claim 1 wherein said tail section is formed of a pair of downwardly extending triangularly shaped panels extending between edges of said opening in said rim and the sector shaped opening in said body and a lower edge of said tail section, said lower edge extending generally parallel to the plane of the upper edge of said body from the point of the cone to the outer edge of said rim.

5. An aircraft according to claim 4 wherein said sector shaped opening is an approximately 60° sector.

6. An aircraft according to claim 1 wherein said tail section is formed of a pair of downwardly extending triangularly shaped panels extending between edges of said opening in said rim and the sector shaped opening in said body and a lower edge of said tail section, said lower edge extending generally parallel to the plane of the upper edge of said body from the point of the cone.

7. An aircraft according to claim 6 wherein said sector shaped opening is an approximately 90° sector and said panels are formed in the shape of an isosceles triangle.

8. An aircraft according to claim 1 wherein said tail section is formed of a pair of downwardly extending panels of generally triangular shape, each panel having one edge attached to an edge of said opening in said rim and an edge of the sector shaped opening in said body, another edge forming a lower edge of said tail section, said lower edge extending generally parallel to the plane of the upper edge of said body, and a third edge formed at a radius.

9. An aircraft according to claim 8 wherein said sector shaped opening is an approximately 60° sector and said radius is the radius of the outer edge of said rim.

10. An aircraft according to claim 1 including a shiftable weight rotatably attached to said body along the longitudinal axis of the aircraft, the center of gravity of said weight being spaced from the point of attachment to said body whereby the aircraft banks in a direction directly related to the position of the center of gravity of said weight with respect to the longitudinal axis of the aircraft.

* * * * *